Figure 1:
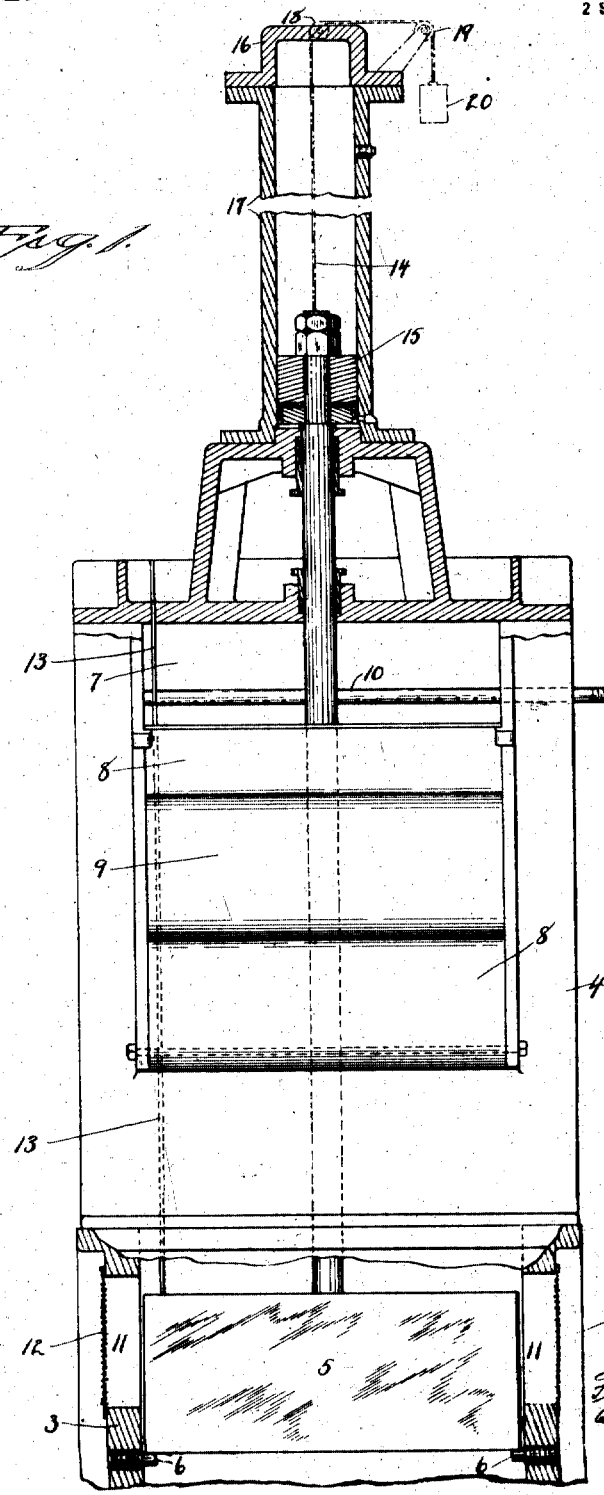

F. H. BANBURY.
MACHINE FOR TREATING RUBBER AND OTHER HEAVY PLASTIC MATERIAL.
APPLICATION FILED FEB. 7, 1918.

1,279,824.

Patented Sept. 24, 1918.
2 SHEETS—SHEET 1.

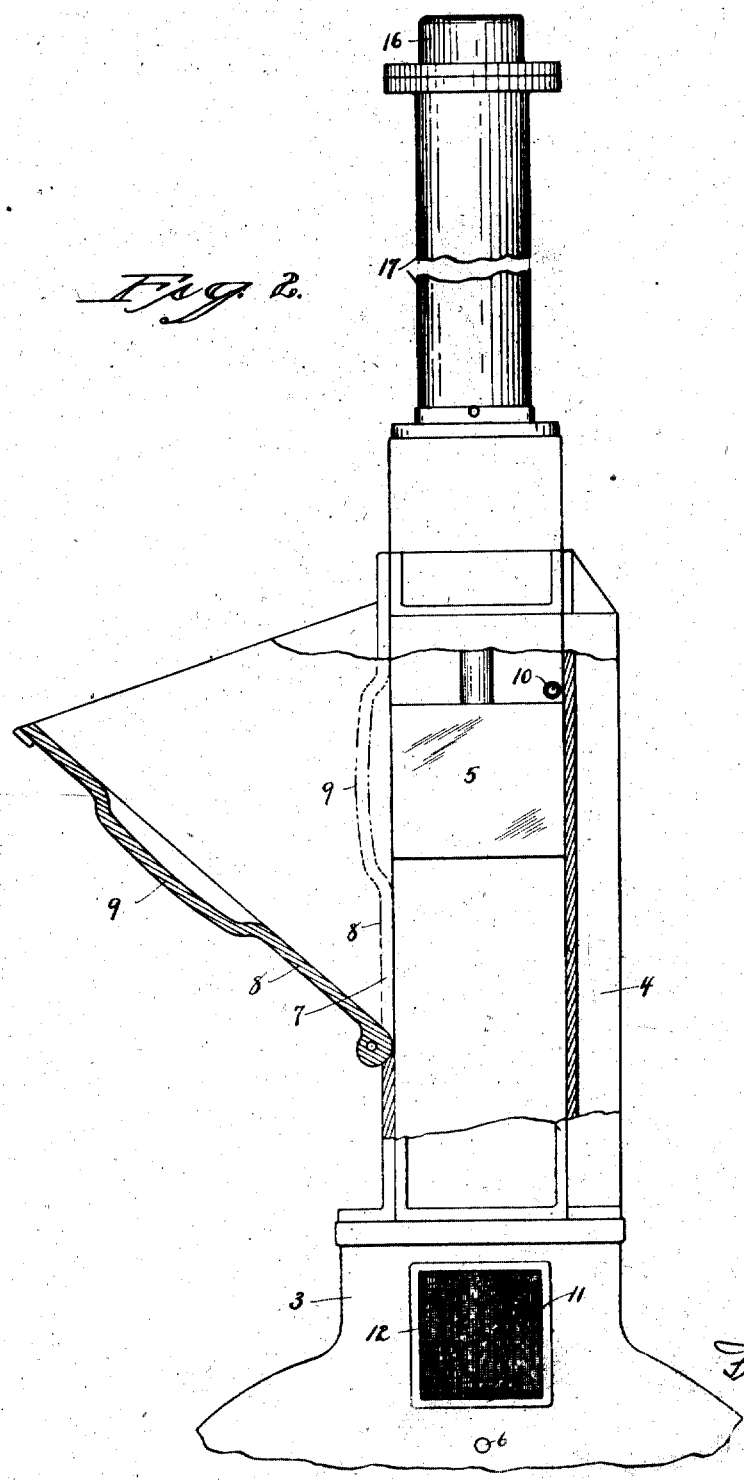

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIAL.

1,279,824.   Specification of Letters Patent.   Patented Sept. 24, 1918.

Application filed February 7, 1918. Serial No. 215,767.

*To all whom it may concern:*

Be it known that I, FERNLEY H. BANBURY, a subject of the King of Great Britain, residing at Ansonia, in the county of New Haven and State of Connecticut, have invented a new and useful Improvement in Machines for Treating Rubber and other Heavy Plastic Material; and I do hereby declare the following, when taken in connection with the accompanying drawings and the characters of reference marked thereon, to be a full, clear, and exact description of the same, and which said drawings constitute part of this application, and represent, in—

Figure 1 a front view partly in section of the upper part of a machine for mixing rubber or other heavy plastic material constructed in accordance with my invention.

Fig. 2 a side view partly in section, of the same.

This invention relates to an improved machine for treating rubber and other heavy plastic material, and particularly to machines comprising a casing, a long neck opening into the top of the casing, a weight within the neck to force the material into the path of rotary blades mounted in the casing, such, for instance, as is shown in my application filed April 20, 1917, Serial No. 163419. In mixing rubber certain powders are used and fed into the neck of the machine, but unless the bottom wall of the hopper or chute stands in a nearly vertical position these powders will not fall by gravity. One object of this invention is to provide a chute onto which material may be furnished and adapt that chute to be turned to a vertical position, so that the material thereon will fall into the casing. In using all these powder-like substances material will accumulate on the top of the weight; and another object of this invention is to provide a blower to remove such accumulations. If such a blower is used provision must be made for the escape of air; and another feature of the invention is the placing of a screen in the lower end of the neck or top of the casing. Furthermore when such a blower is employed, it will be placed in operation only when the weight is in an elevated position, and another object of this invention is to indicate the position of the weight, this feature being also desirable to indicate the condition of the material being mixed. In mixing rubber, for instance, as it approaches its completed state, it becomes such a solid mass that the weight is raised up and down as the rotary blades turn the mass, and the movement up and down of this indicating rod shows to the operator the condition of the material being mixed; and the invention consists in the details of construction as will be hereinafter described and particularly recited in the claims.

In carrying out my invention, and as shown in the application above referred to, I employ a casing 3 with a long vertically arranged neck 4 in which a weight 5 travels, this weight being arrested in its downward movement by pins 6. In order to feed material into the casing I form an opening 7 in one side of the neck, and to the neck I hinge a chute 8 which is adapted to be turned down into an inclined position so that material may be readily placed upon it and turned up against the casing so as to stand in a substantially vertical position so that material on the chute will drop into the neck, and at the same time the chute will close the opening 7. In this chute is an offset portion 9 for the purpose as will hereinafter appear. Extending transversely across the neck above the point reached by the weight in its uppermost position, is a perforated pipe 10 connected with any suitable air supply, the perforations being directed toward the top of the weight so as to blow off any dust which may accumulate on the weight. This blowing takes place when the weight is in its uppermost position, and the offset 9 on the chute is in line with the position of the weight in its uppermost position, and so forms a by-pass around the weight for the escape of dust blown by the pipe 10. To provide for the escape of the air from the pipe 10, I form an opening 11 in the upper part of the casing or lower part of the neck, which opening is closed by a screen 12 of fine mesh, which permits the escape of air but which will retain powder. To indicate the position of the weight and so as to be sure that it is in its uppermost position before the air is turned on, I provide an indicator rod 13 which is mounted in the top of the weight and extends upward through the top of the casing. This indicator rod not only shows when the weight is in its uppermost position so that the operator may turn on a current of air to the pipe 10, but also indicates the movement of the weight during the operation of mixing material in the casing. As before stated, as the operation of mixing rubber approaches its completion, the mass is in such large lumps that the weight will be moved up and down, and the extent of movement will indicate to the operator the condition of material to be treated. It is obvious that instead of connecting the indicator rod directly with the weight, it might be a cable or cord 14 attached to the piston 15 and extending upwardly through the top 16 of the piston rod casing 17 over idler pulleys 18 and 19 and provided with an indicating weight 20, as shown by broken lines in Fig. 1.

I claim:—

1. A machine of the class described comprising a casing and a neck opening into the top of the casing, an opening in one side of the neck, and a chute hinged to the casing and adapted to close said opening.

2. A machine of the class described comprising a casing and a neck opening into the top of the casing, an opening in one side of the neck, and a chute hinged to the casing and adapted to close said opening and formed with a transverse offset.

3. In a machine of the class described comprising a casing and a neck, a weight vertically movable in said neck, and an air pipe located in the top of the neck and adapted to discharge air across the upper face of the weight.

4. In a machine of the class described comprising a casing, a neck opening into the top of the casing, a weight vertically movable in said neck, an air pipe opening onto the upper face of the weight, an opening in the upper end of the casing, and a screen across said opening.

5. A machine of the class described comprising a casing, a neck extending upward therefrom, a weight movable in said neck, and an indicator moving with the weight.

6. A machine of the class described comprising a casing, a neck extending upward therefrom, a weight movable in said neck, and an indicator rod connected with the weight and extending upward through the upper end of the neck.

7. A machine of the class described comprising a casing, a neck extending upward therefrom, a weight vertically movable in said casing, an opening in said neck, a chute hinged to the neck at the lower end of the opening and normally closing said opening and adapted to be turned into an inclined position so as to expose said opening, said chute formed with a transverse offset, an air pipe extending across the upper part of the neck and adapted to discharge air onto the top of the weight, an opening in the upper end of the casing and a screen across said opening.

In testimony whereof, I have signed this specification in the presence of two subscribing witnesses.

F. H. BANBURY.

Witnesses:
FREDERIC C. EARLE,
C. L. WEED.